US005826319A

United States Patent [19]
Colwell et al.

[11] Patent Number: 5,826,319
[45] Date of Patent: Oct. 27, 1998

[54] METHOD FOR MATCHMOUNTING AN UNIFLATED AUTOMOBILE TIRE ON A WHEEL

[75] Inventors: Dean A. Colwell, Chesterfield Township; Paul George Doan, Warren, both of Mich.

[73] Assignee: Fori Automation, Inc., Shelby Township, Mich.

[21] Appl. No.: 654,645

[22] Filed: May 29, 1996

[51] Int. Cl.$^6$ .................................................. B23Q 17/00
[52] U.S. Cl. .................................... 29/407.04; 29/407.05; 29/407.09; 29/802
[58] Field of Search ............................ 29/407.04, 407.05, 29/407.09, 407.1, 464, 802; 157/1.1, 1; 73/146

[56] References Cited

U.S. PATENT DOCUMENTS

| | | | |
|---|---|---|---|
| 3,207,557 | 9/1965 | Hunter | 301/5 |
| 3,518,878 | 7/1970 | Landsness et al. | 73/146 |
| 3,631,716 | 1/1972 | Monajjem | 73/146 |
| 3,808,660 | 5/1974 | Wik | 29/159 R |
| 3,949,794 | 4/1976 | Marshall | 144/288 |
| 3,951,563 | 4/1976 | Ravenhall | 408/1 R |
| 4,198,858 | 4/1980 | Farmer et al. | 73/146 |
| 4,279,287 | 7/1981 | Daudi et al. | 152/375 |
| 4,359,897 | 11/1982 | Ugo | 73/146 |
| 4,451,963 | 6/1984 | Karr et al. | 29/407 |
| 4,547,945 | 10/1985 | Lawson | 29/407 |

OTHER PUBLICATIONS

"Wheel Runout and Balance," J.N. Bradley, SAE Technical Paper 590385 (SP–171(c)), 1959.
"Truck tire Balance and Runout," M.A. Wilson, et al., SAE Technical Paper 590388 (SP–171(f)), 1959.
"Effect of Wheel Nonuniformities on the Tire–Wheel Assembly and the vehicle," A.L. Nedley, SAE Technical Paper 680005, 1968.
"Radical Improvements in Tire and Wheel Manufacture—Their Effects Upon Radial Force Variation of the Assembly," A.L. Nedley, et al., SEA Technical Paper 700089. 1970.
"Tire Roughness—Which tire Nonuniformities Are Responsible," K.D. marshall, et al., SAE Technical Paper 740066, 1974.

*Primary Examiner*—David P. Bryant
*Attorney, Agent, or Firm*—Reising, Ethington, Learman & McCulloch, PLLC

[57] ABSTRACT

A method and apparatus is provided for reducing the combined runout of an uninflated automobile tire and wheel assembly. Runout is reduced by aligning a tire mark located on the tire with a wheel mark located on the wheel, where the tire mark is indicative of the high point of radial runout of the tire and the wheel mark is indicative of the low point of radial runout of the wheel. The location of the wheel mark is tracked using a video camera while the wheel is rotated relative to the tire and rotation is halted once the linear distance between the marks is minimized. The locations within the video image of the tire and wheel marks are determined relative to a Cartesian coordinate system having its origin at the center of the video image. The direction of relative rotation is selected based upon which quadrants contain the marks and, in the case of the marks being in the same or non-contiguous quadrants, the direction of rotation is selected based upon a comparison of the slope of a line extending through the origin and the wheel mark with the slope of a line extending through the origin and the tire mark. The speed of rotation can be varied during rotation in accordance with the distance between the marks.

19 Claims, 7 Drawing Sheets

METHOD FOR MATCHMOUNTING AN UNIFLATED AUTOMOBILE TIRE ON A WHEEL

TECHNICAL FIELD

This invention relates to methods and apparatus for reducing the runout of a combined automotive tire and wheel assembly by aligning the tire's maximum first harmonic radial runout with the wheel's minimum first harmonic radial runout.

BACKGROUND OF THE INVENTION

Within the automobile industry, it is well known that non-uniformities in automotive wheel assemblies make a significant contribution to the overall noise and vibration experienced by vehicle occupants. One of the types of non-uniformities that exist in production tires and wheels is an out-of-roundness condition that is commonly referred to as runout. Runout causes what is know in the automobile industry as smooth road shake, an undesirable vibration of the vehicle that can often be felt by the vehicle occupants.

It has long been recognized that smooth road shake can be reduced by orienting the angular location of the maximum first harmonic of radial runout of the tire with the minimum first harmonic of radial runout of the wheel so that the two runouts subtract and cancel each other to some extent. See, e.g., "Wheel Runout and Balance," J. N. Bradley, SAE Technical Paper 590385 (SP-171 (c)), 1959, and "Truck Tire Balance and Runout," M. A. Wilson et al., SAE Technical Paper 590388 (SP-171 (f)), 1959. This process of "matching" the tire with the wheel to help minimize the effects of runout has also been proposed for use on a production basis. See, e.g., "Effect of Wheel Nonuniformities on the Tire-Wheel Assembly and the Vehicle," A. L. Nedley, SAE Technical Paper 680005, 1968, and "Radical Improvements in Tire and Wheel Manufacture—Their Effects Upon Radial Force Variation of the Assembly," A. L. Nedley et al., SAE Technical Paper 700089, 1970.

Furthermore, automated equipment for angularly orienting the uninflated tire with respect to its wheel have been developed for production purposes. See, e.g., U.S. Pat. No. 4,451,963, issued Jun. 5, 1984 to W. F. Karr et al., and U.S. Pat. No. 4,547,945, issued Oct. 22, 1985 to L. J. Lawson. The equipment disclosed in these patents utilize marks or tags that have been placed on the tires and wheels by their respective manufacturers to indicate the angular position of a predetermined characteristic of the tire or wheel. For tires, the mark typically identifies the maximum first harmonic of radial runout (which is commonly referred to as the high point of the tire) and for the wheel, the mark typically identifies the minimum first harmonic of radial runout (which is commonly referred to as the low point of the wheel). Thus, alignment of the wheel mark with the tire mark provides the desired matching of the high point of the tire with the low point of the wheel. Examples of machines for providing such marking are disclosed in U.S. Pat. Nos.: 3,631,716, issued Jan. 4, 1972 to F. Monajjem; 4,198,858, issued Apr. 22, 1980 to D. Farmer et al.; and 4,359,897 issued Nov. 23, 1982 to J. W. Ugo.

The wheel and tire positioning system disclosed in the above-noted Karr et al. patent includes a pair of workstations, a conveyor line that indexes pallets between the two workstations, and a computer connected to the workstations. The first workstation is a sensing station that determines the relative angular relationship of the wheel and tire indicia. The sensing station uses a pair of sensing heads that are rotated about the rotational axis of the tire and wheel to determine the angular relationship of the tire and wheel indicia to each other. The tire and wheel are then moved to the second station, which is an orientation station that uses a wheel clamp to rotate the wheel with respect to the tire to align the tire and wheel indicia using the angular relationship determined at the sensing station.

The tire and wheel alignment system disclosed in the Lawson patent includes a rotating device for rotating the wheel, a centering device for centrally locating the wheel and tire over the rotating device, a sensor assembly for reading the wheel and tire marks, a tire clamping device for preventing rotation of the tire while the wheel rotates, and a computer responsive to the sensor assembly for controlling the tire clamping device. The tire and wheel are first rotated together until a tire mark optical sensor in the sensing assembly detects the tire mark, at which point the tire clamping device is actuated to restrain the tire from further rotation. The wheel is then further rotated until the wheel mark is located at this same angular position, as determined by the computer using a separate wheel optical sensor. An alternative sensor arrangement is also disclosed that utilizes an electronic camera controlled by a computer to sense the locations of the tire and/or wheel marks. The tire marking can be sensed prior to rotation of the assembly. The tire can then be clamped against any further rotation and the tire marking can be noted by the computer. The wheel is then rotated until its mark, as sensed by the electronic camera and computer, is aligned with the tire mark.

SUMMARY OF THE INVENTION

The present invention provides a method and apparatus for matchmounting an uninflated automobile tire relative to a wheel upon which the tire is mounted, wherein the tire includes a tire mark representative of a characteristic of the tire and the wheel includes a wheel mark representative of a characteristic of the wheel. The method includes the steps of: (a) determining the spatial location of the tire mark; (b) determining the spatial location of the wheel mark; (c) generating distance data indicative of the linear distance between the spatial locations; and (d) rotating the wheel with respect to the tire in accordance with the distance data until the tire and wheel marks achieve a preselected relative orientation. Preferably, the tire mark indicates the angular location of the high point of the tire and the wheel mark indicates the angular location of the low point of the wheel and step (d) of the method preferably involves aligning the tire and wheel marks by rotating the wheel with respect to the tire until the distance between the tire and wheel marks is minimized.

The apparatus of the invention includes a frame, a wheel clamp, a tire clamp, a drive source for one of the clamps, an optical sensor, and an electronic circuit. The wheel clamp selectively engages and disengages the wheel, while the tire clamp selectively engages and disengages the tire. One of the clamps is rotationally driven via the drive source while the other clamp is engaged to thereby provide relative rotation between the tire and wheel. The optical sensor (such as a video camera) has a field of view that includes both the tire and wheel marks and the sensor is operable to provide image data representative of an image that contains the tire and wheel marks. The electronic circuit receives the image data from the sensor and is operable to process the image data and determine therefrom (1) the location within the image of the tire and wheel marks and (2) the linear distance between the tire and wheel marks. The circuit is further operable to generate a drive signal in accordance with the determined distance between the tire and wheel marks and this drive signal is used by the drive source to rotate the driven clamp.

In accordance with another aspect of the invention, relative rotation of the tire and wheel marks to a preselected relative orientation is achieved in an accurate manner by tracking the position of the one of the marks that is being rotated about the tire and wheel axis. This permits monitoring of the distance between the marks and, where the marks are being rotated into alignment, this tracking can be used to determine when the distance between the marks has been minimized.

In accordance with another aspect of the invention, the direction of relative rotation is determined in accordance with the location of the marks within quadrants of a Cartesian coordinate system and, if necessary, the slopes of the two lines extending through the origin of the coordinate system and a different one of each of the two marks.

In accordance with yet another aspect of the invention, the speed of relative rotation between the tire and wheel is varied in accordance with the determined distance between the marks.

BRIEF DESCRIPTION OF THE DRAWINGS

A preferred exemplary embodiment of the present invention will hereinafter be described in conjunction with the appended drawings, wherein like designations denote like elements, and.

DESCRIPTION OF THE PREFERRED EMBODIMENT

The illustrated embodiment described below is designed to be used in conjunction with tires and wheels having a fluorescent tag or mark that indicates the high and low points of the tire and wheel, respectively. In the figures, the wheel and uninflated tire are indicated in phantom.

Figure 1:
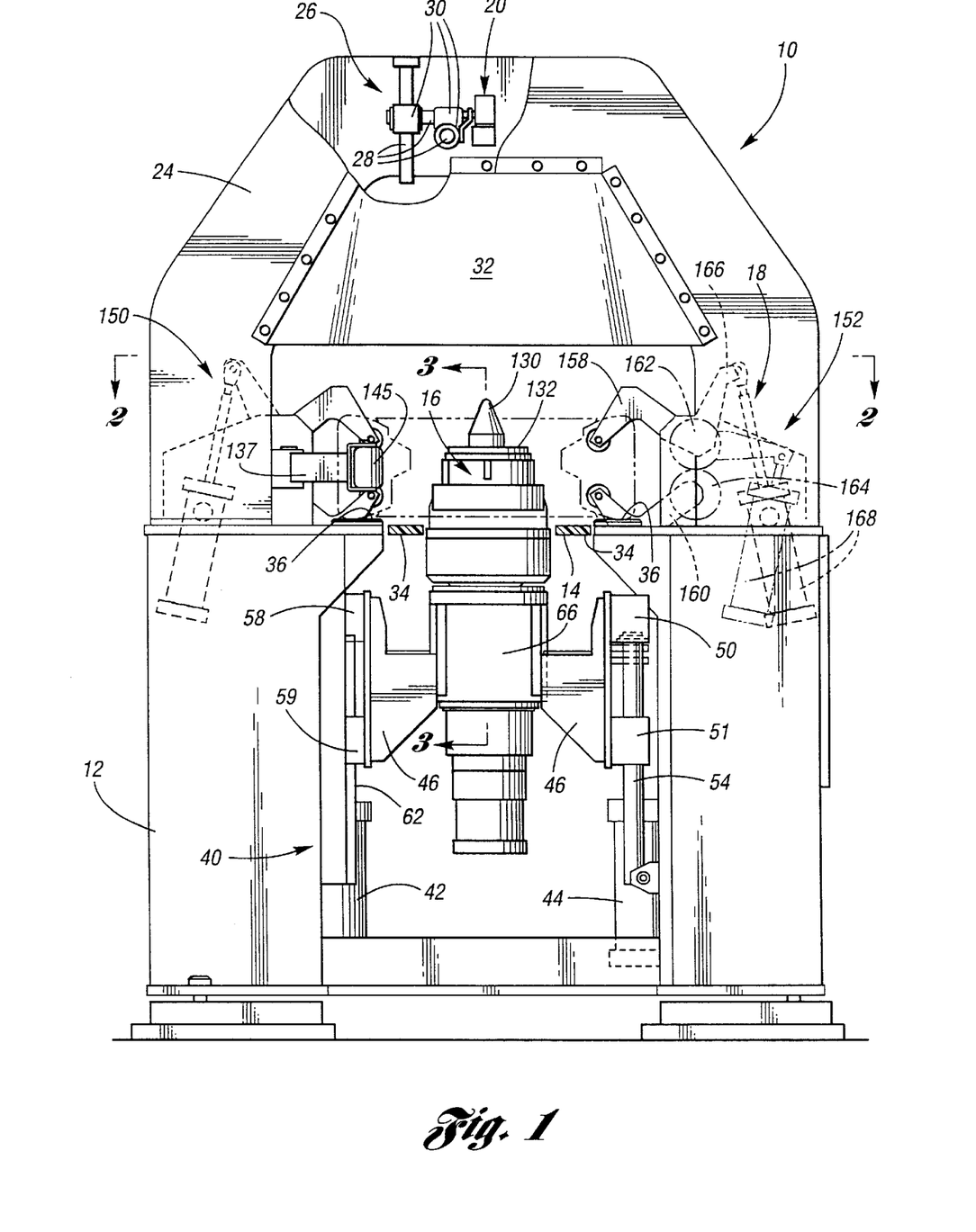
FIG. 1 is an end elevation of a preferred embodiment of the apparatus of the invention.

As shown in FIG. 1, a matchmount station of the invention, designated generally as 10, is shown as it might be constructed for use in a tire mounting and inflation production line. In the illustrated embodiment, station 10 includes a frame 12, a section of a conveyor 14, a wheel clamp 16, a tire clamp 18, a video camera 20, and an electronic control circuit 22 (shown in FIG. 4). Wheel clamp 16 is both rotatable and vertically extendable, as will be discussed below. In operation, conveyor 14 is used to move an uninflated tire mounted on a vehicle wheel into position at station 10, after which camera 20 and control circuit 22 are used to determine the location of the tire and wheel marks while wheel clamp 16 and tire clamp 18 are operated to clamp the wheel and tire, respectively. Then, control circuit 22 determines the desired direction of relative rotation between the tire and wheel and initiates rotation of the wheel via wheel clamp 16 while tire clamp 18 maintains the tire stationary. Control circuit 22 uses the video data from camera 20 to track the location of the wheel mark as it is rotated and the rotation is halted once control circuit 22 has determined that the distance between the tire and wheel marks has been minimized. The operation of station 10 under control of circuit 22 will be described below in greater detail in connection with FIGS. 4–7.

Matchmount station 10 includes an upper camera housing 24 mounted on frame 12. Camera housing 24 is a U-shaped housing open towards wheel clamp 16 that extends upward from frame 12 and bridges conveyor 14. Camera 20 is mounted at the upper inside portion of housing 24, as indicated by the cut-away portion of housing 24 shown in FIG. 1. Camera 20 is mounted on a multiply-adjustable mounting 26 that uses a series of three shafts 28 and mounts 30. Each of the three mounts 30 is adjustable to different positions along its corresponding shaft 28 to provide adjustable positioning of camera 20 in three dimensions. Ultraviolet lamps (not shown) are mounted within the inclined portions of camera housing 24 to help highlight the fluorescent tags seen by camera 20. A shroud 32 is bolted to housing 24 at each end of station 10 to block overhead light that would directly illuminate the tire and wheel.

Conveyor 14 is a conventional lift and carry conveyor that includes a pair of conveyor slats 34 that engage one side of the wheel and tire assembly. Matchmount station 10 has a pair of tire and wheel support surfaces 36 located laterally of and adjacent to the conveyor slats to support the tire and wheel when conveyor slats 34 lower to the position shown in FIG. 1.

Figure 2:
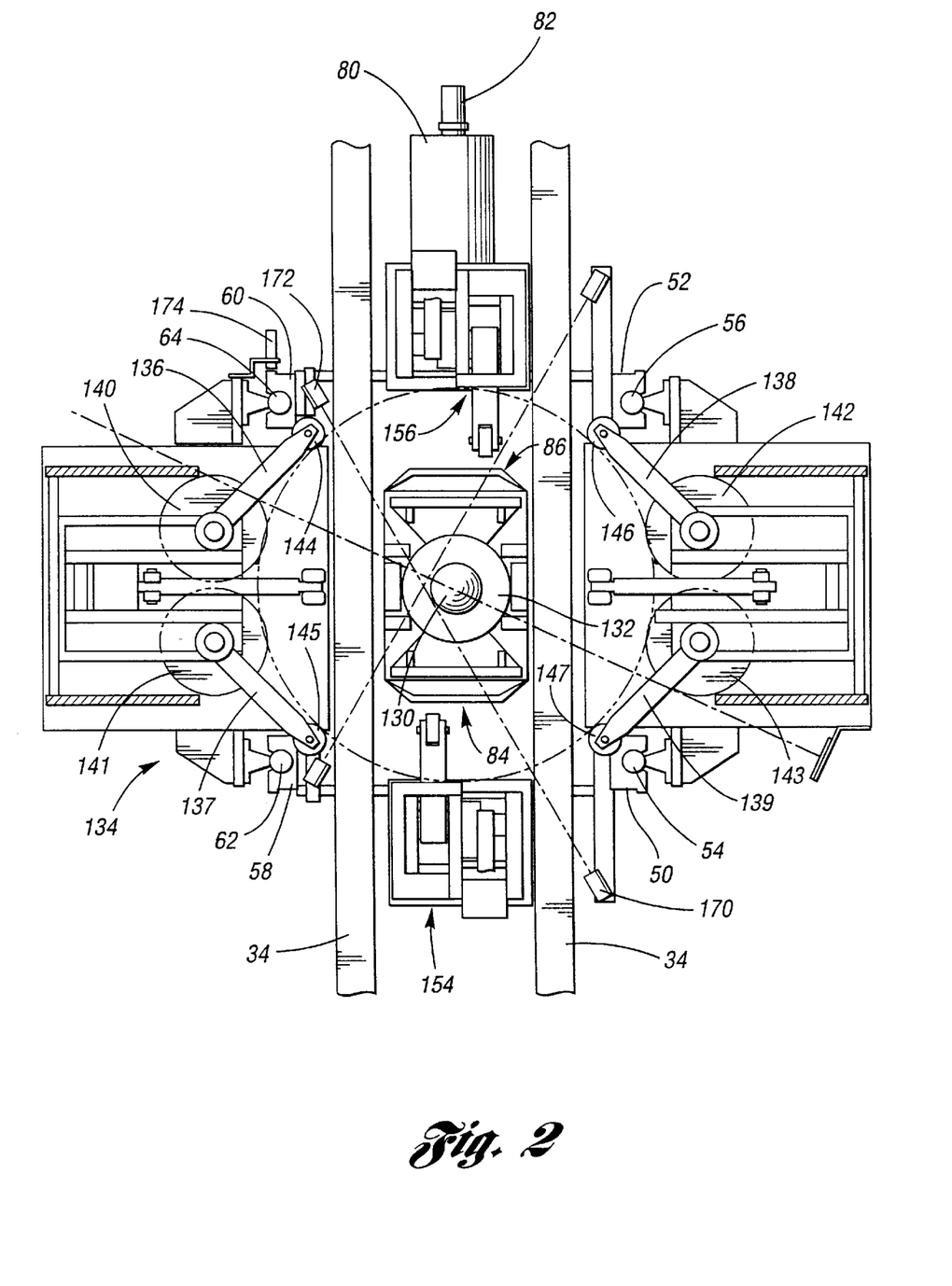
FIG. 2 is a top view of the conveyor and clamp portion of the apparatus of FIG. 1 taken from the perspective shown by the II—II line of FIG. 1.

Wheel clamp 16 is used to lift the tire and wheel from support surfaces 36 and then to frictionally clamp and rotate the wheel relative to the mounted, uninflated tire. This vertical and rotational movement is accomplished with a wheel clamp assembly 40 shown in FIGS. 1–3. Vertical movement is accomplished using a pair of air cylinders 42, 44 that are mounted to frame 12 and that have an output rod (not shown) connected to a support bracket 46 that supports the vertically positionable portions of wheel clamp assembly 40. Support bracket 46 includes two sets of guide rail bearing blocks 50–53 and 58–61. Bearing blocks 50–53 are located to one side of conveyor 14 and are constrained to vertical movement by a pair of guide rails 54, 56 rigidly connected to frame 12, as shown in FIGS. 1 and 2. Similarly, bearing blocks 58–61 are constrained to vertical movement by a pair of guide rails 62, 64. Thus, activation of air cylinders 42 and 44 causes support bracket 46 to move vertically by way of bearing blocks 50 and 51 sliding along guide rail 54, bearing blocks 52 and 53 sliding along guide rail 56, bearing blocks 58 and 59 sliding along guide rail 62, and bearing blocks 60 and 61 sliding along guide rail 64.

Figure 3:
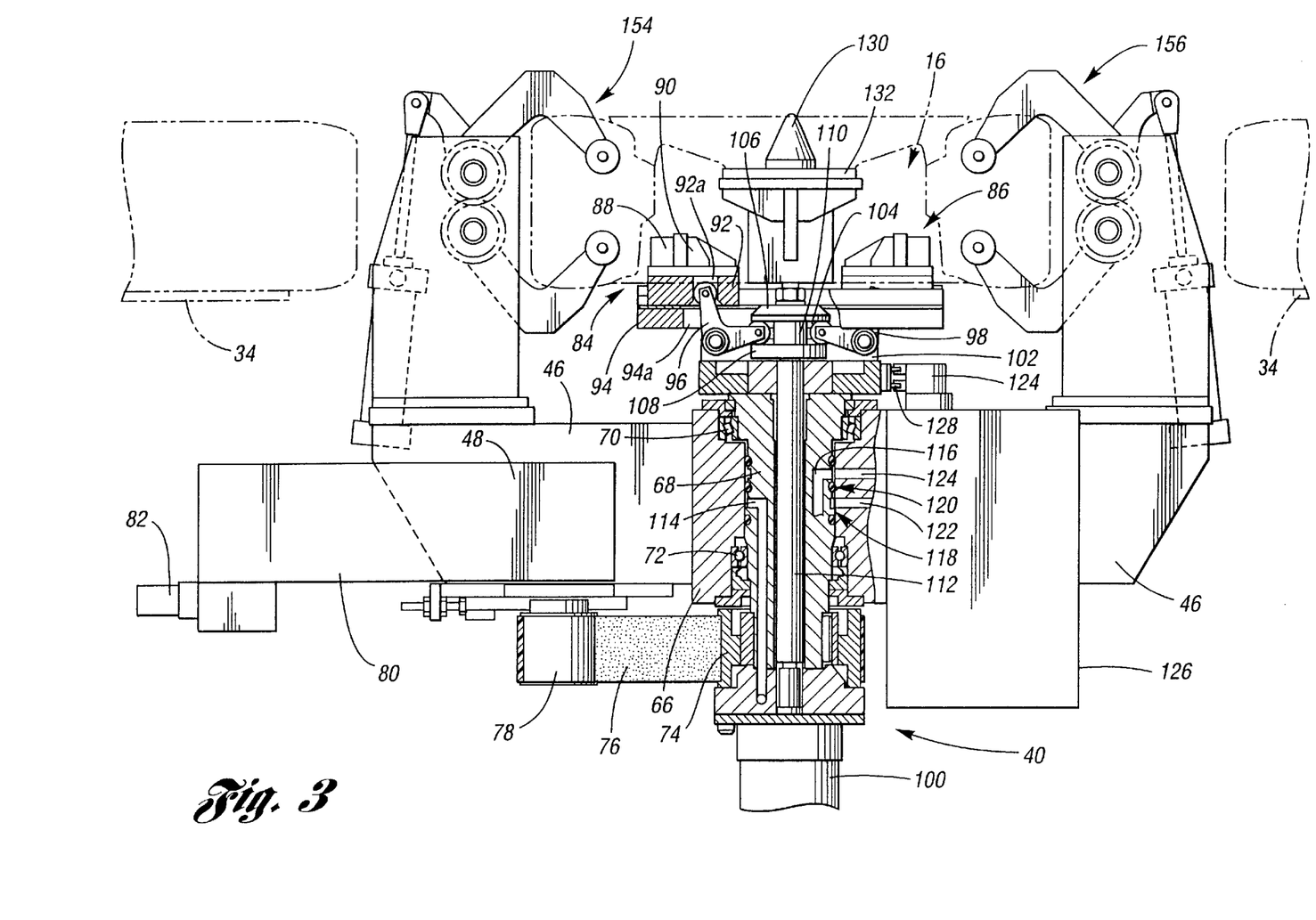
FIG. 3 is a sectional view of the vertically positionable portion of the wheel clamp of the apparatus of FIG. 1 taken generally along the III—III line of FIG. 1.

Support bracket 46 is welded to and supports a bearing housing 66. As shown in FIG. 3, wheel clamp assembly 40 includes a vertical stem 68 that is mounted in bearing housing 66 via upper and lower bearings 70 and 72, respectively. Mounted to stem 68 below bearing housing 66 is a pulley 74 that is driven via a belt 76 by a drive pulley 78. Pulley 78 is connected to the output shaft of a gear box 48 which is driven by a servo motor 80 that is connected to control circuit 22 via a cable 82. As with bearing housing 66, servo motor 80 is rigidly connected to, and moves with, support bracket 46.

Wheel clamp 16 grips the wheel by forcing a pair of clamp members 84, 86 radially outwardly so that they frictionally engage the inner surface of the wheel. Each clamp member includes a nylon pad 88 attached to a backing plate 90 that is mounted on a clamp base 92. The nylon pad permits frictional clamping of the wheel, but does not scratch or otherwise damage the wheel. The clamp bases are supported on and slidable with respect to a base plate 94 that is rigidly connected to vertical stem 68. Control of the radial position of clamp members 84, 86 is accomplished using a pair of pivot arms 96 and 98, respectively, that are driven by a single air cylinder 100 mounted to vertical stem 68 at its lower end. Pivot arm 96 comprises two unitary links that extend away from each other by 90° and that are pivotally mounted at their common end to an upper unitary portion 102 of vertical stem 68. One link extends upwards through a slot 94a in base plate 94 and is captured at its free end in a cavity 92a within clamp base 92. The other link extends to an annular cavity 104 created by a pair of spaced flanges 106, 108. These flanges are unitary extensions of a post 110 which is connected to the upper end of an extension rod 112 that is connected to the output shaft of air cylinder 100. At the end of each link of pivot arm 96 is a roller that prevents abrasive contact between the pivot arm and both the clamp base 92 and flanges 106, 108. Pivot arm 98 is identical to pivot arm 96, except that it extends up into a cavity within the clamp base of clamp member 86. As will be appreciated, when air cylinder 100 is activated to extend its output shaft, extension rod 112 is pushed upwardly, moving flanges 106, 108 upward and causing pivot arms 96, 98 to rotate so as to move clamp members 84, 86 radially outwardly and into frictional engagement with the inner surface of the wheel. Conversely, retraction of air cylinder's output shaft causes pivot arms 96, 98 to rotate about their pivot axes so as to move radially inwardly and out of contact with the wheel.

Air is supplied to air cylinder 100 via pneumatic feeds or passages 114, 116 in vertical stem 68. Since air cylinder 100 rotates along with stem 68, air is supplied to passages 114 and 116 by a pair of rotational pneumatic unions 118, 120, respectively, that permit pressurized air to be supplied from respective pneumatic supplies 122, 124 in bearing housing 66 to passages 114, 116, respectively.

In the illustrated embodiment, wheel clamp 16 is rotated to a home position after completion of alignment of the tire and wheel marks and prior to retraction below the surface of conveyor 14. Wheel clamp 16 is then maintained at that home position until the next tire and wheel assembly has been conveyed into matchmount station 10 and lifted off the conveyor surface by wheel clamp assembly 40. This home position is shown in FIGS. 1–3 and, as best seen in FIG. 2, maintaining wheel clamp 16 in this home position during vertical movement avoids the possibility of wheel clamp 16 striking conveyor slats 34 if retracted or extended vertically. Referring back to FIG. 3, this home position is normally determined using a resolver that is a part of servo motor 80. However, to initially determine this home position at power-up of matchmount station 10, a switch 124 is mounted on a portion 126 of support bracket 46, and a contact piece 128 is attached to wheel clamp 16 to rotate therewith. As will be appreciated, contact piece 128 activates switch 124 when wheel clamp 16 is rotated to its home position.

Wheel clamp assembly 40 includes a rough locator 130 that enters the wheel's center hole when clamp assembly 40 is raised and that centers the wheel by virtue of the conical shape of locator 130. Just below locator 130 is a wheel support plate 132 upon which the wheel sits when being raised off the tire and wheel support surfaces 36 shown in FIG. 1. As shown in FIG. 2, a centering mechanism 134 is used to provide initial centering of the tire and wheel prior to entry of rough locator 130 into the center hole of the wheel. Centering mechanism 134 includes four centering arms 136–139 that simultaneously rotate towards the center of the tire and wheel to accurately position the tire and wheel assembly. Centering arms 136 and 137 are connected at one end to spur gears 140, 141, respectively, that are meshed together. Similarly, centering arms 138 and 139 are connected at one end to spur gears 142, 143, respectively, that are meshed together. A chain (not shown) connects the two sets of spur gears together so that a single drive (also not shown) can be used to simultaneously drive all four centering arms into and out of engagement with the tread surface of the tire. At the free end of each centering arm 136–139 is a roller 144–147 147, respectively, that prevents scuffing or damage to the tire tread and that reduces the friction between the centering arms and tire.

As shown in FIG. 1, tire clamp 18 comprises a pair of pincher clamps 150, 152 disposed on opposite sides of conveyor 14. Referring briefly to FIGS. 2 and 3, an additional pair of pincher clamps 154, 156 can be located on support plate 46 between the slats 34 of conveyor 14. Clamps 150–156 are identical (with the exception that clamps 154 and 156 raise and lower along with support plate 46) and only clamp 152 will therefore be described. Turning back to FIG. 1, pincher clamp 152 has upper and lower clamp arms, 158, 160 that are rigidly connected at their proximal ends to respective spur gears 162, 164 that are mounted for rotation about a fixed axis. Integral with upper clamp arm 158 is a lever arm 166 that extends from its proximal end at spur gear 162 to a distal end that is connected to the output shaft of an air cylinder 168. As will be appreciated, when air cylinder 168 is activated to extend its output shaft, lever arm 166 is rotated upwards, causing the distal end of upper clamp arm 158 to move downward and press against one of the tire's sidewalls. At the same time, due to the meshing of gears 162 and 164, the distal end of lower clamp arm 160 moves upward and into contact with the other tire sidewall. This position is shown in FIG. 1. The net effect of this movement of upper and lower clamp arms 158, 160 is to push the tire beads towards each other and away from the wheel's bead seats, thereby reducing the amount of friction between the tire and wheel. Thus, the tire is not only clamped against rotation, but the amount of clamping force needed between the wheel clamp and the wheel in order to rotate the wheel relative to the tire is reduced.

To open clamp 152, air cylinder 168 is activated to retract its output shaft, which pulls down on lever arm 166 and causes the upper and lower clamp arms 158, 160 to release the tire. This retracted position of the air cylinder and lever arm are also indicated in FIG. 1. As indicated in that figure, air cylinder 168 is pivotally mounted to account for the arcuate path taken by the distal end of lever arm 166. To protect against scuffing or other damage to the tire sidewall, the distal end of each pincher clamp can have a roller or rollers, as indicated in FIG. 2.

Figure 4:
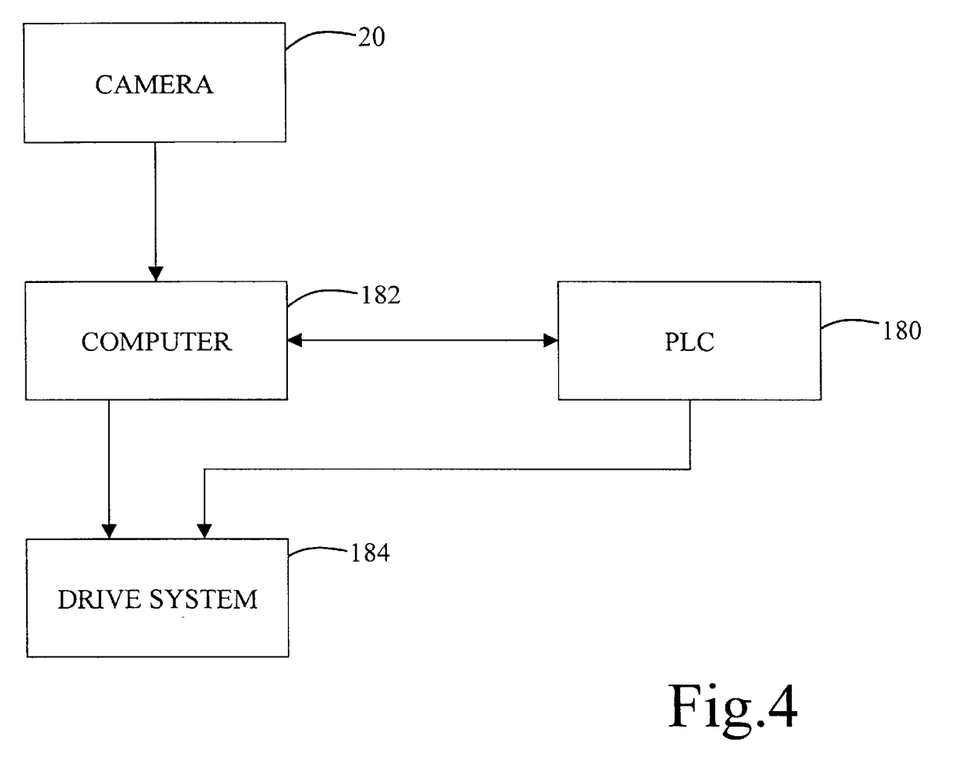
FIG. 4 is a block diagram of the control system for the apparatus of FIG. 1.

Before turning to FIG. 4 and the description of control circuit 22, it should be noted that, in addition to camera 20, matchmount station 10 includes the necessary electronic sensors and switches to provide data to control circuit 22 regarding the presence or absence of a tire and wheel assembly, as well as the position of the various air cylinders. For example, as shown in FIG. 2, an optical transmitter 170 and optical receiver 172 can be used to detect the presence of a tire and wheel assembly at wheel clamp 16. Similarly, a proximity sensor 174 can be used to detect the extended, or lift, position of wheel clamp assembly 40 and, more particularly, air cylinders 42 and 44 of FIG. 1. Also, a ferrous proximity switch (not shown) can be used to detect whether the wheel is aluminum or steel and that information can then be used to optimize the camera settings to minimize the possibility that the wheel and tire marks will not be properly located by the image processing carried out by control circuit 22. The type and use of such sensors as a part of the PLC (programmable logic controller) and as a part of the computer control of matchmount station 10 can be readily determined by those skilled in the art.

Turning now to FIG. 4, control circuit 22 will now be described. Control circuit 22 comprises a PLC 180, a personal computer 182, and a drive system 184 which provides the necessary motion control and operating power to servo motor 80 based on a signal from computer 182. PLC 180 and computer 182 operate together to control the operations necessary to align the tire and wheel marks with PLC 180 controlling the sequence of operations and computer 182 being used to process the camera's video image data to track the location of the wheel mark and control the direction and speed of servo motor 80 so as to align the marks.

More particularly, as shown in FIG. 4, the video image data from camera 20 is provided to computer 182 for image processing to determine the location of the tire and wheel marks within the video image. Computer 182 communicates with PLC 180, receiving enable signals from PLC 180 that indicate when it may begin processing the video data and activating motor 80, as well as receiving type information indicating the tire and wheel size and even the type of wheel present (e.g., steel or aluminum). Computer 182 also sends information to PLC 180, such as status signals indicating that it has finished aligning the marks. Both PLC 180 and computer 182 are connected to drive system 184, with the PLC providing an enable signal and the computer providing the actual drive signal that is used to energize motor 80. As will be appreciated by those skilled in the art, when used as a part of a tire mounting and inflation line, PLC 180 can be a single PLC that is used for controlling the entire line. Thus, the information received from PLC 180 regarding the tire and wheel can be obtained at an earlier station in a known manner. One such way of detecting wheel size is using an arm that has an encoder and that swings into contact with the outer surface of the wheel. Wheel size can then be determined based upon the amount of travel sensed using the encoder.

Preferably, PCL 180 is a PLC-5/60, manufactured by Allen Bradley. Computer 182 can be a 9450 computer, made by Xycom, Inc. of Saline, Mich. As discussed further below, computer 182 utilizes an image processing board (not shown), which can be an Image-LC, manufactured by Matrox. Drive system 184, including servo motor 80, can comprise a Vickers 2-axis SMC-20 motion controller, type SMC-20-S-1-115, with Vickers brushless servo drive amplifiers, such as BRD series single axis monoblock, type BRD.4SB20, and with a Vickers FAS"T" series brushless servo motor, model FAS.T2.M4.030.002. Camera 20 can be a TM-7CN, manufactured by Pulnix, and can have a fish-eye lens and a filter selected to block light at wavelengths other than that reflected from the tire and wheel marks.

Figure 5:
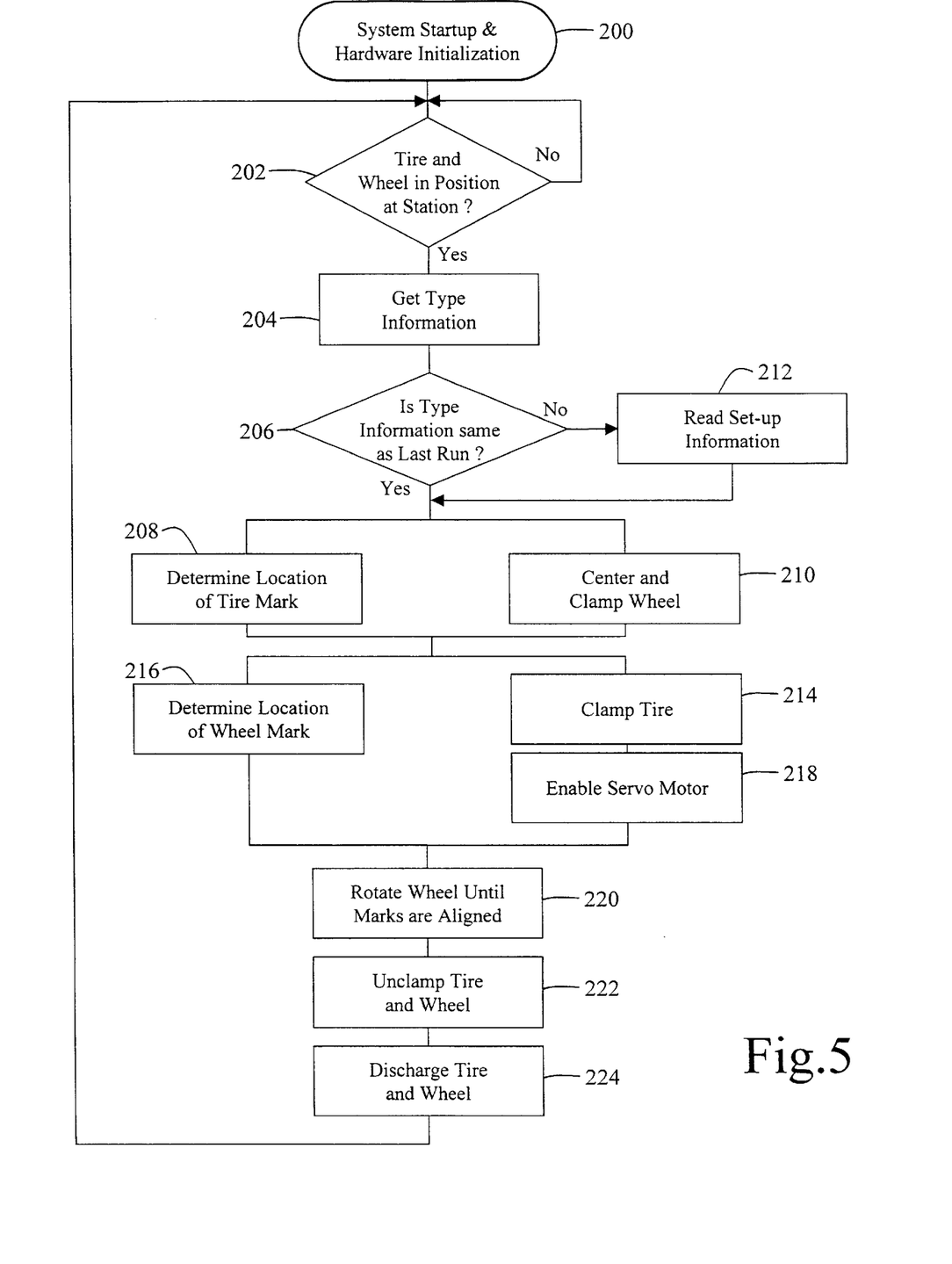
FIG. 5 is a flow chart depicting a preferred embodiment of the method of the invention.

Referring now to FIG. 5, the sequence of operation of matchmount station 10 is shown. The sequence starts at block 200 where the system is initially powered up and the hardware initialized, which includes retracting both wheel clamp 16 and tire clamp 18, as well as rotating wheel clamp 16 to its home position and lowering it below the conveyor surface. Next, station 10 waits for a tire and wheel assembly to be brought into place by conveyor 14, as indicated at block 202. Once this occurs, the computer acquires type information (i.e., data relating to the wheel size and type) from PLC 180, as shown at block 204. Using this type information, computer 182 can determine the approximate distance from the center of the video image to the tire and wheel marks. Additionally, computer 182 can select different camera settings (e.g., the camera aperture size) and different gain, threshold, and offset settings to maximize the contrast between the marks and the background. The values of these settings can be stored on the computer's hard drive and simply accessed as needed once the type information is received from PLC 180. Also, these settings can be selected as a part of an initial machine calibration that takes place after matchmount station 10 has been installed and using the actual background lighting conditions that will exist during operation of station 10. Once computer 182 receives the type information from PLC 180, a check is made to determine if the type information is the same as that for the most recent tire and wheel assembly aligned by station 10. This is shown at block 206. If so, then the alignment process begins, as indicated at blocks 208 and 210. If the type information is different, then new settings are accessed from the hard disk and used to set up both camera 20 and the image processing board within computer 182, as indicated at block 212. The wheel alignment process then begins.

The first steps in the wheel alignment process are to center and clamp the wheel (block 208) and determine the location of the tire mark within the image seen by the camera (block 210). These two steps can be carried out at the same time to help minimize the cycle time of matchmount station 10. The wheel is initially centered using centering mechanism 134 to insure that rough locator 130 will enter the wheel's center hole when wheel clamp assembly 40 is raised. As will be understood based upon the above description of wheel clamp assembly 40, the wheel is clamped by first moving wheel clamp 16 upwards to raise the tire and wheel from the conveyor support surfaces and then air cylinder 100 is activated to cause wheel clamp 16 to engaged the inside surface of the wheel to thereby clamp it against movement independent of wheel clamp 16.

Determination of the location within the video image of the tire mark is accomplished using the functions available on the image processing board (IPB) within computer 182. More specifically, this is accomplished by defining a mask that blocks out all of the video image received from camera 20, except for an annular portion that is selected based upon the expected radial location of the tire mark. The size and radius of the annular, unmasked portion of the video image is chosen in accordance with the known tire size by providing the IPB with a radius and width. The location of the tire mark is then determined using standard image processing functions that: locate the tire mark based upon its contrast with the background; perform a center-of-mass determination; and then return the coordinates of the center of the tire mark. These standard image processing functions are provided by the IPB. If desired, determination of the coordinates of the tire mark can be repeated one or more times using different frames of video image data to help insure that the coordinates returned by the image processing routine are indeed those of the tire mark. The tire is not yet clamped at this point to prevent the clamp arms of tire clamp 18 from obstructing the camera's view of the tire mark.

Once the tire mark located, computer 182 informs PLC 180 that the initial scan is complete. The next steps are to clamp the tire and determine the location of the wheel mark, as indicated by blocks 214 and 216, respectively. Tire clamping is accomplished using the tire clamp 18, as described above. Thereafter, servo motor 80 is enabled by PLC 180, as indicated at block 218. Determination of the location of the wheel mark can be carried out while the tire is being clamped and the servo motor is being enabled to help minimize the cycle time. The wheel mark coordinates are determined in the same manner as is used for the tire mark, except that a different radius is used in defining the annular search area of the video image.

Once both the tire and wheel have been clamped and the location of their respective marks has been determined, the wheel rotation can begin. Thus, as indicated at block 220, the wheel is rotated with respect to the tire until the marks are aligned. As will be discussed below in greater detail, alignment of the tire and wheel marks is achieved by tracking the location of the wheel mark as the wheel is rotated and halting relative rotation once the linear distance between the tire and wheel marks has been minimized. After the tire and wheel marks are aligned, the tire and wheel are unclamped (block 222) and the tire and wheel assembly is discharge from matchmount station 10 and moved on (e.g., to an inflator) by conveyor 14 (block 224).

The steps identified at blocks 208, 216, and 220 of determining the location of the marks and rotating the wheel to align the marks will now be described in greater detail in connection with FIG. 6. As will be understood by those skilled in the art, the various steps shown in FIG. 6 can be implemented by suitable programming of computer 182. The first step in this process is to determine which direction the wheel should be rotated to minimize the amount of relative rotation necessary to align the marks. This determination is made according to the relative locations of the marks within a rectangular Cartesian coordinate system having as its origin the center of the video image, which is assumed to be, but may not in fact be, the center of the tire and wheel. This process involves determining which quadrant contains the tire mark followed by determining which quadrant contains the wheel mark, as indicated by blocks 226 and 228, respectively. Then, as shown at block 230, the direction of rotation is selected based upon which quadrants contain the marks or, in the event the marks are in the same or non-contiguous quadrants, the direction is selected based upon a comparison of the slope of the line that extends through the origin and the tire mark with the slope of the line that extends through the origin and the wheel mark.

More specifically, determination of which quadrant a particular mark is located in can be accomplished by examining the sign (positive or negative) of the X and Y coordinates. This is summarized in Table I below.

TABLE 1

| X | Y | Quadrant |
|---|---|----------|
| + | + | 1 |
| − | + | 2 |
| − | − | 3 |
| + | − | 4 |

For a frame of video image data, it is conventional practice to identify the location of individual pixels relative to an origin that is located at the upper left corner of the frame and to assume that X increases in the positive direction when moving from left to right and that Y increases in the positive direction when moving from top to bottom. Thus, determination of the quadrants can be accomplished by comparing the coordinates of the marks with a calculated pixel position that represents the center of the image. For the X-axis, the origin can be represented by a positive X-value equal to $N/2$, where N represents the number of pixels in a single one of the camera's scan lines. The X-coordinate of a mark will then be positive if it exceeds $N/2$ and will be negative if it is less than $N/2$. Similarly, for the Y-axis, the origin can be represented by a positive Y-value equal to $M/2$, where M represents the number of scan lines in the video image. The Y-coordinate of a mark will then be positive if it is less than $M/2$ and will be negative if it exceeds $M/2$.

The direction of rotation is selected by comparing which quadrants contain the marks. If the marks are either in the same quadrant or are in non-contiguous quadrants (e.g. quadrants 1 and 3), then the direction of rotation is to be selected based upon a comparison of the slopes of the two lines defined by the origin and each of the two marks. In particular, the first line is defined as the line extending through the origin (center of the image) and through the center of the tire mark. The second line is defined as the line extending through the origin and through the center of the wheel mark. If the slope $(m_t)$ of the line through the tire mark is not equal to the slope $(m_w)$ of the line through the wheel mark (and it rarely, if ever, will be equal), then the two marks are not exactly opposite or aligned with one another since the center of the video image is assumed to be the center of the tire and wheel. Thus, the relative magnitudes of the slopes can be used to determine which direction requires the least amount of rotation to align the marks. If the slope of the wheel line $(m_w)$ is greater than the slope of the tire line $(m_t)$ and both marks are in the same quadrant, or if the slope of the wheel line is less than the slope of the tire line and the marks are in different, non-contiguous quadrants, then the rotation of the wheel is selected to be in the clockwise (CW) direction. Otherwise, the rotation is selected to be in the counter-clockwise (CCW) direction.

Table 2 summarizes the various possible combinations of quadrant locations and the corresponding direction of rotation of the wheel.

TABLE 2

| Tire Mark Quadrant | Wheel Mark Quadrant | Direction of Rotation |
|---|---|---|
| 1 | 1 | if $m_w > m_t$: CW else: CCW |
| 1 | 2 | CW |
| 1 | 3 | if $m_w > m_t$: CCW else: CW |
| 1 | 4 | CCW |
| 2 | 1 | CCW |
| 2 | 2 | if $m_w > m_t$: CW else: CCW |
| 2 | 3 | CW |
| 2 | 4 | if $m_w > m_t$: CCW else: CW |
| 3 | 1 | if $m_w > m_t$: CCW else: CW |
| 3 | 2 | CCW |
| 3 | 3 | if $m_w > m_t$: CW else: CCW |
| 3 | 4 | CW |
| 4 | 1 | CW |
| 4 | 2 | if $m_w > m_t$: CCW else: CW |
| 4 | 3 | CCW |
| 4 | 4 | if $m_w > m_t$: CW else: CCW |

As mentioned above, alignment of the tire and wheel marks is achieved by rotating the wheel relative to the tire until the linear distance between the two marks is minimized. Thus, once the direction of desired rotation has been established, the next step is to calculate the linear distance between the tire and wheel marks. This is indicated at block 232. Determination of this distance can be done in terms of pixel distance without any need for relating that distance to actual English or metric units. As will be appreciated, the linear distance can be determined using the Pythagorean theorem and the coordinates of the two marks. That is:

$$\text{distance} = d_{tw} = \sqrt{(x_w - x_t)^2 + (y_w - y_t)^2} \quad \text{Equation 1}$$

where the coordinates of the tire mark are $(x_t, y_t)$ and the coordinates of the wheel mark are $(x_w, y_w)$.

To further optimize the performance of matchmount station 10, the speed of servo motor 80, and, hence, of the wheel, is continuously adjusted during rotation in accordance with the linear distance between the marks. This is indicated at block 234. Adjustment of the speed during rotation enables the wheel to be rotated at higher speeds while the linear distance is great and thereafter be slowed down as the wheel mark approaches the tire mark. This helps minimize the amount of time required to align the marks while preventing the wheel mark from overshooting its desired final position. The speed can be determined according to the following equation:

$$\text{speed} = (d_{tw} - d_{min}) * sf \quad \text{Equation 2}$$

where:

$d_{min}$ is the minimum distance possible between the marks and can be calculated by subtracting the linear distance between the origin and tire mark from the linear distance between the origin and the wheel mark, and sf is a scale factor that is equal to twice the maximum motor speed divided by the maximum distance, with the maximum distance being calculated by adding the linear distance between the origin and tire mark to the linear distance between the origin and the wheel mark.

The calculated speed can then be trimmed to within predetermined maximum and minimum values, if needed, as indicated at block 236.

Once the rotational direction and speed have been determined and PLC 180 has enabled drive system 184, rotation of the wheel can begin, as indicated at block 238. As the rotation proceeds, the location of the rotating wheel mark is continuously tracked and this tracking is limited in resolution only by the frame rate (e.g., 30 or 60 Hz) of camera 20. Each time a new video image is acquired and provided to computer 182, the location of the marks are determined and compared to see if the distance between the marks has been minimized. This check is made at block 240. If the distance has been minimized, that is, if the marks are aligned, then rotation is halted, the tire and wheel are unclamped, and the matched tire and wheel assembly can be discharged from the station, as indicated by blocks 222 and 224 if FIG. 5. If they are not yet aligned, then the process performs another iteration of blocks 232–240. In this way, the distance between the marks is constantly tracked and the speed of rotation is constantly updated according to Equation 2. This process then repeats until the distance between the marks has been minimized.

Figure 6:
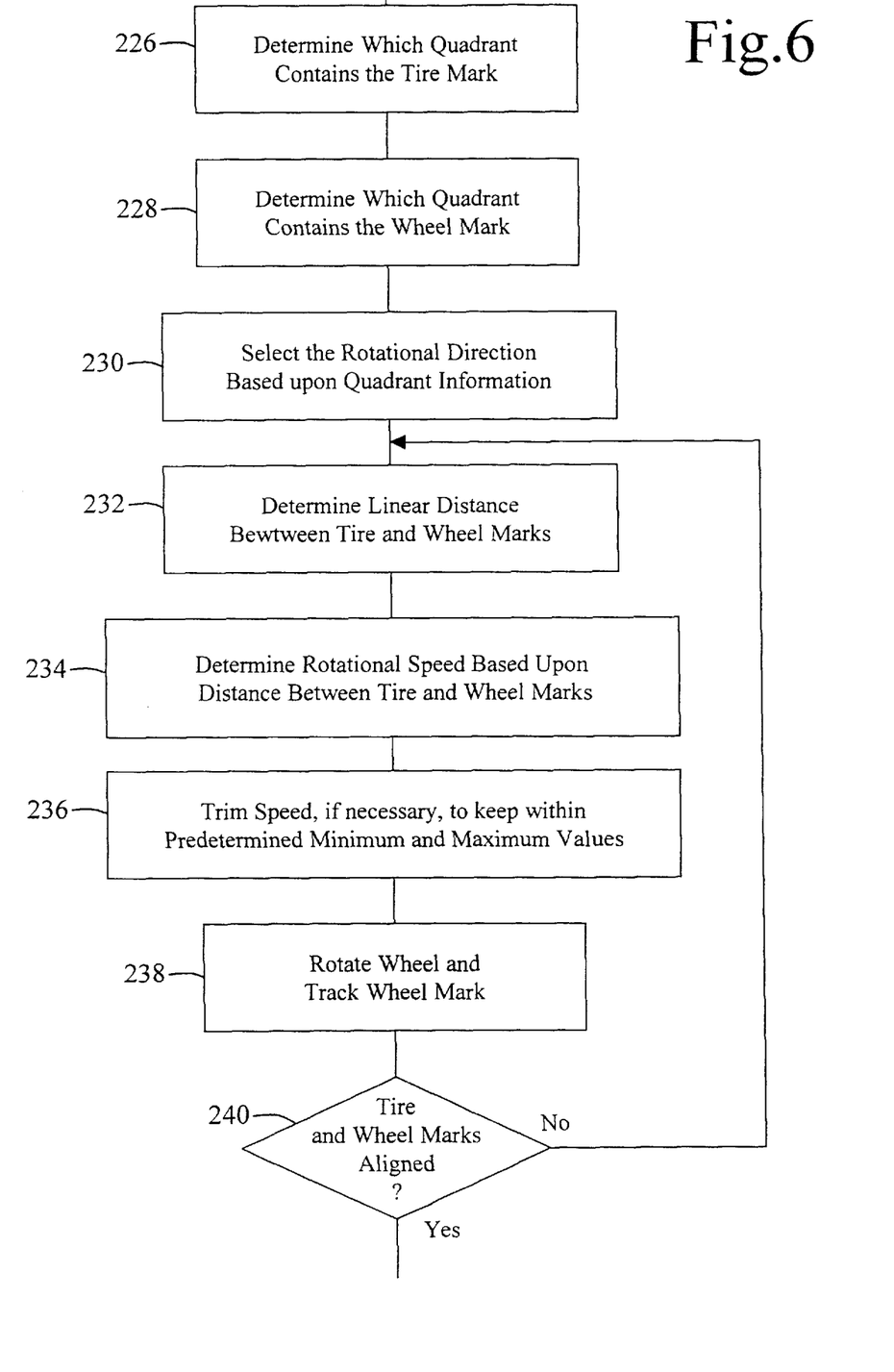
FIG. 6 is a flow chart depicting certain blocks of FIG. 5 in greater detail.
Figure 7:
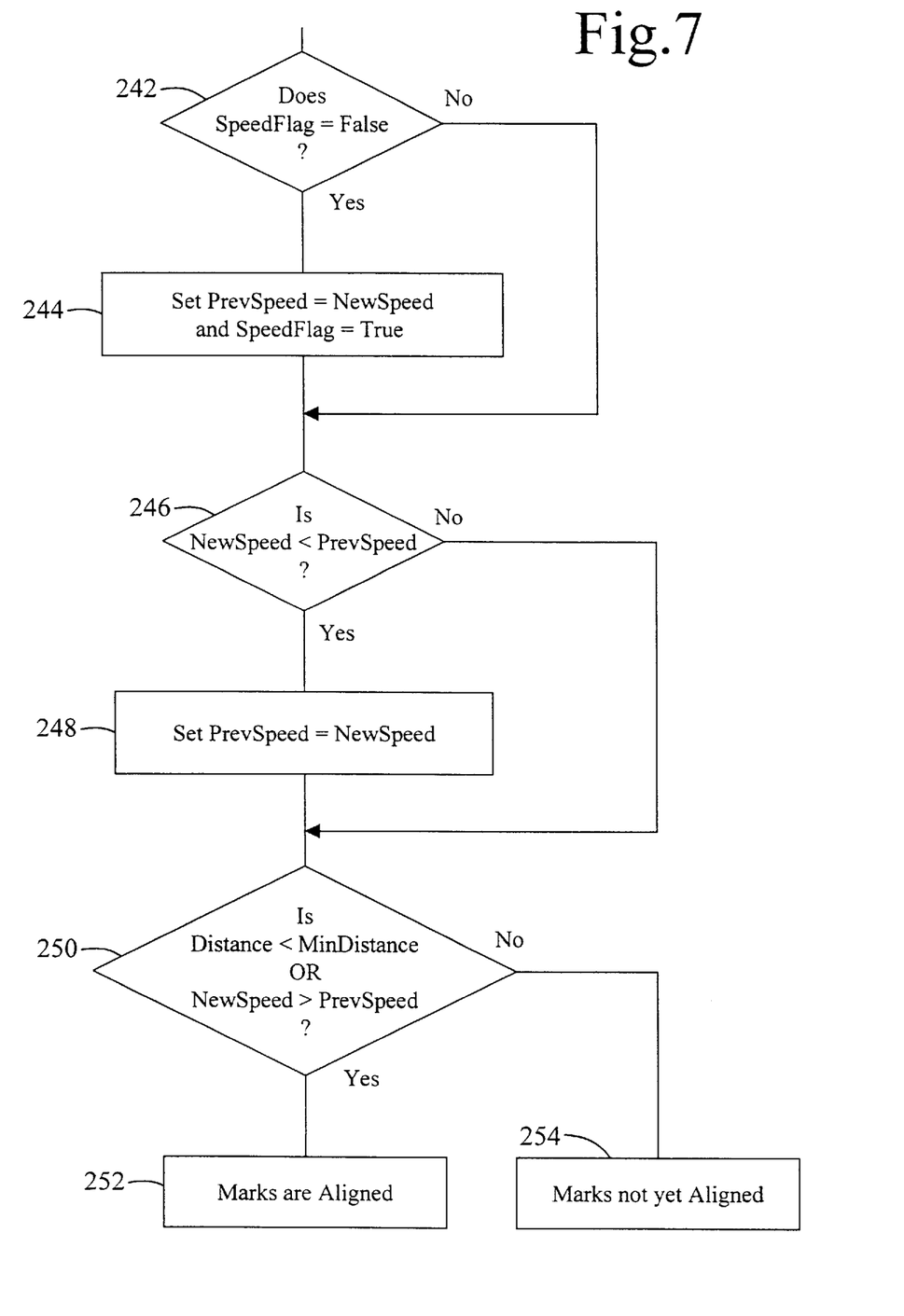
FIG. 7 is a flow chart depicting a preferred method of the invention for determining when the tire and wheel marks are aligned.

Turning now to FIG. 7, the process indicated at block 240 of FIG. 6 is shown in greater detail. This process actually involves two tests, the satisfaction of either of which is taken to mean that the distance between the marks has been minimized. The first test is whether the current distance between the marks is less than a minimum distance which is set equal to $d_{min}$ plus a small value (e.g., 5 pixels). The second test is whether the rotational speed calculated at blocks 234 and 236 of FIG. 6 is greater than the speed calculated during the last iteration. As will be appreciated, such an increase in speed indicates that the linear distance between the marks is increasing and that, therefore, the wheel mark has begun to pass by the tire mark.

Comparison of the current calculated speed with the previous speed is implemented in the illustrated embodiment by using two variables PrevSpeed and NewSpeed to store the previous and current speed values, respectively. A flag called SpeedFlag is initialized to false for each new tire and wheel assembly and is used to indicate whether the value stored in PrevSpeed is valid. During the first iteration through blocks 232–240 of FIG. 6, there is no previous speed and thus the value of PrevSpeed does not represent valid data. Accordingly, the first step is to make the check at block 242 of whether SpeedFlag is false. If so, it indicates that only one iteration of blocks 232–240 has been made and PrevSpeed is therefore set equal to NewSpeed (the current speed), as indicated at block 244. Also, SpeedFlag is then set equal to true, indicating that PrevSpeed now holds valid data. Flow then moves to block 246 where a check is made to determine if the new speed is less than the previous speed. This condition will never be true after the first iteration, since PrevSpeed is set equal to NewSpeed at block 244. However, if SpeedFlag had been false when the check was made at block 242 (which it will be for every one but the first iteration), then NewSpeed will be less than PrevSpeed as the linear distance between the marks decreases. If the speed has decreased, then PrevSpeed is set equal to NewSpeed in preparation for the next iteration, as indicated at block 248. Flow then moves to block 250. If the speed has not decreased, then block 248 is skipped and flow moves directly to block 250.

The two above-mentioned tests of alignment of the marks are made at block 250. The first is a test of whether the linear distance is less than a constant named MinDistance which is equal to $d_{min}$ plus the small value discussed above. The second test is whether NewSpeed is greater than PrevSpeed. As will be appreciated, NewSpeed will either be equal to PrevSpeed (such as where PrevSpeed had been greater than or equal to NewSpeed and was therefore set equal to NewSpeed at block 248) or will be greater than PrevSpeed. If NewSpeed is greater, then the distance between the marks is beginning to increase, meaning that the tire mark is beginning to be passed. Thus, if either of these two tests are satisfied, alignment of the marks is assumed, as indicated at block 252, in which case the process will move to block 222 of FIG. 5. If neither test is satisfied, then the marks are not yet aligned, as indicated at block 254, in which case the process will move to block 232 of FIG. 6 for another iteration.

Other techniques and variations of the above-described tests could be used to determine when the distance between the marks has been minimized. For example, rather than comparing the new speed and previous speed, the current distance could be compared to the previous distance. Alternatively, the two marks could be used to define opposing corners of a rectangle and rotation could be carried out until the area of the rectangle is minimized. Also, since the center of the video image may not be the same as the center of the tire and wheel, the distance between the marks may actually increase slightly at the beginning of rotation. Thus, to prevent the wheel rotation from halting due to this slight increase in distance, the second test given in block 250 could be modified to so as to compare NewSpeed with PrevSpeed plus a small fudge factor (e.g., NewSpeed>PrevSpeed+5).

It will thus be apparent that there has been provided in accordance with the present invention a method and apparatus for matchmounting an uninflated automobile tire on a wheel which achieves the aims and advantages specified herein. It will of course be understood that the foregoing description is of a preferred exemplary embodiment of the invention and that the invention is not limited to the specific embodiment shown. Various changes and modifications will become apparent to those skilled in the art. For example, relative rotation between the tire and wheel could be achieved by holding the wheel stationary and rotating of the tire. All such variations and modifications are intended to come within the scope of the appended claims.

We claim:

1. A method of orienting an uninflated tire relative to a wheel upon which the tire is mounted, wherein the tire includes a tire mark representative of a characteristic of the tire and the wheel includes a wheel mark representative of a characteristic of the wheel, the method comprising the steps of:

(a) determining the spatial location of said tire mark,
   (b) determining the spatial location of said wheel mark,
   (c) determining the linear distance between said spatial locations, and
   (d) rotating the wheel with respect to the tire in accordance with said linear distance until said tire and wheel marks achieve a preselected relative orientation.

2. The method defined in claim 1, wherein step (d) further comprises rotating the wheel with respect to the tire until the linear distance between said tire and wheel marks is minimized, whereby said preselected relative orientation is angular alignment of said marks.

3. The method of claim 2, wherein steps (c) and (d) further comprise the steps of:

maintaining a first one of said marks stationary, and
   rotating the second one of said marks while iteratively carrying out the following steps:
   (i) acquiring a video image that includes said second mark,
   (ii) generating image data representative of said video image,
   (iii) determining said spatial location within said video image of said second mark,
   (iv) generating distance data indicative of the distance between said spatial locations of said marks, and
   (v) repeating steps (i) through (iv) until the distance between said tire and wheel marks is minimized.

4. The method defined in claim 1, wherein successive iterations of steps (b) and (c) are repeatedly carried out during step (d).

5. The method defined in claim 4, wherein step (d) further comprises rotating the wheel with respect to the tire until the linear distance indicates that the linear distance is less than a predetermined minimum distance.

6. The method defined in claim 4, further comprising the step of varying the speed of rotation of the wheel with respect to the tire in direct proportion to said linear distance.

7. The method defined in claim 1, wherein steps (a) and (b) further comprise:

acquiring a video image that includes said tire and wheel marks,
   generating image data representative of said video image,
   processing said image data to determine said spatial locations within said video image of said tire and wheel marks.

8. The method defined in claim 7, further comprising the steps of:

relating said spatial locations to a Cartesian coordinate system having its origin proximate the center of said video image and having four quadrants about said origin,
   identifying which of said quadrants contains said tire mark and which of said quadrants contains said wheel mark, and
   if said tire and wheel marks are in contiguous quadrants, selecting the direction of relative rotation between the tire and wheel in accordance with the previously identified quadrants, and
   if said tire and wheel marks are in the same quadrant or in non-contiguous quadrants, selecting the direction of relative rotation between the tire and wheel in accordance with the relative slopes of a pair of lines, each of which extends through said origin and a different one of said tire and wheel marks.

9. The method defined in claim 1, further comprising the step of varying the speed of rotation of the wheel with respect to the tire in accordance with said linear distance.

10. A method of orienting an uninflated tire relative to a wheel upon which the tire is mounted, wherein the tire includes a tire mark representative of a characteristic of the tire and the wheel includes a wheel mark representative of a characteristic of the wheel, the method comprising the steps of:

(a) determining the spatial location of said tire mark,
   (b) determining the spatial location of said wheel mark,
   (c) generating distance data indicative of the linear distance between said spatial locations,
   (d) rotating the wheel with respect to the tire in accordance with said distance data until said tire and wheel marks achieve a preselected relative orientation,
   (e) repeatedly carrying out successive iterations of steps (b) and (c) during step (d),
   (f) varying the speed of rotation of the wheel with respect to the tire in direct proportion to said distance data; and
   (g) calculating a new speed value in accordance with the distance data during the first iteration of step (c),
   wherein each subsequent iteration of step (c) further comprises:
       storing the new speed value as a previous speed value,
       generating next distance data that is indicative of the current distance between said spatial locations, and
       updating the new speed value based upon the next distance data, and
   wherein step (d) further comprises carrying out the following steps after each of the subsequent iterations of step (c):
       comparing the new speed value with the previous speed value, and
       rotating the wheel with respect to the tire until the new speed value is greater than the previous speed value.

11. A method of determining the direction of rotation of a wheel with respect to an uninflated tire mounted on the wheel so as to minimize the amount of rotation necessary to align a wheel mark on the wheel with a tire mark on the tire, the method comprising the steps of:

determining the spatial location of the tire mark within a Cartesian coordinate system having an origin and four quadrants about said origin,
   determining the spatial location of the wheel mark within said coordinate system,
   identifying which of said quadrants contains said tire mark and which of said quadrants contains said wheel mark, and if said tire and wheel marks are in contiguous quadrants, selecting the direction of relative rotation between the tire and wheel in accordance with the previously identified quadrants, and if said tire and wheel marks are in the same quadrant or in non-contiguous quadrants, selecting the direction of relative rotation between the tire and wheel in accordance with the relative slopes of a pair of lines, each of which extends through said origin and a different one of said tire and wheel marks.

12. A method of orienting an uninflated tire relative to a wheel upon which the tire is mounted, wherein the tire includes a tire mark representative of a characteristic of the tire and the wheel includes a wheel mark representative of a characteristic of the wheel, the method comprising the steps of:

(a) determining the spatial location of said tire mark, (b) determining the spatial location of said wheel mark, (c) generating data indicative of a rectilinear relationship between said spatial locations, and (d) rotating the wheel with respect to the tire in accordance with said data until said tire and wheel marks achieve a preselected relative orientation.

13. The method defined in claim 12, wherein step (c) further comprises determining the linear distance between said spatial locations and wherein step (d) further comprises rotating the wheel with respect to the tire until the linear distance is minimized, whereby said rectilinear relationship is the linear distance between said spatial locations.

14. The method defined in claim 12, wherein said determining steps further comprise determining a pair of coordinates for each of said spatial locations and determining the linear distance between said spatial locations using said coordinates.

15. The method defined in claim 14, wherein said linear distance is determined using said coordinates and the Pythagorean theorem.

16. The method defined in claim 12, further comprising iteratively carrying out steps (b) and (c) during step (d).

17. The method defined in claim 12, further comprising carrying out steps (a) and (b) using an image processing board located within a computer.

18. The method of claim 12, wherein steps (a) and (b) further comprise detecting said tire and wheel marks using an electronic camera that provides images containing said tire and wheel marks and determining said spatial locations using at least one annular mask applied to one or more of said images.

19. The method of claim 18, further comprising determining the spatial location of said tire mark using a first annular mask applied to one or more of said images and determining the spatial location of said wheel mark using a second annular mask applied to one or more of said images.

* * * * *

UNITED STATES PATENT AND TRADEMARK OFFICE
CERTIFICATE OF CORRECTION

PATENT NO. : 5,826,319

DATED : October 27, 1998

INVENTOR(S) : Dean A. Colwell, et al.

It is certified that error appears in the above-identified patent and that said Letters Patent is hereby corrected as shown below:

In the title, after "MATCHMOUNTING AN" delete "UNIFLATED" and insert therefor --UNINFLATED--. Column 6, line 16, delete "147" second occurrence. Column 10, line 48, Table 2, second column, insert --3--.

Signed and Sealed this

Twenty-seventh Day of July, 1999

Attest:

Q. TODD DICKINSON

*Attesting Officer*     Acting Commissioner of Patents and Trademarks